April 17, 1951  E. W. MILLER  2,549,324
MACHINE FOR FINISH CUTTING THE TEETH OF GEARS, GEAR
SHAVING CUTTERS AND THE LIKE
Filed July 25, 1945  5 Sheets-Sheet 1
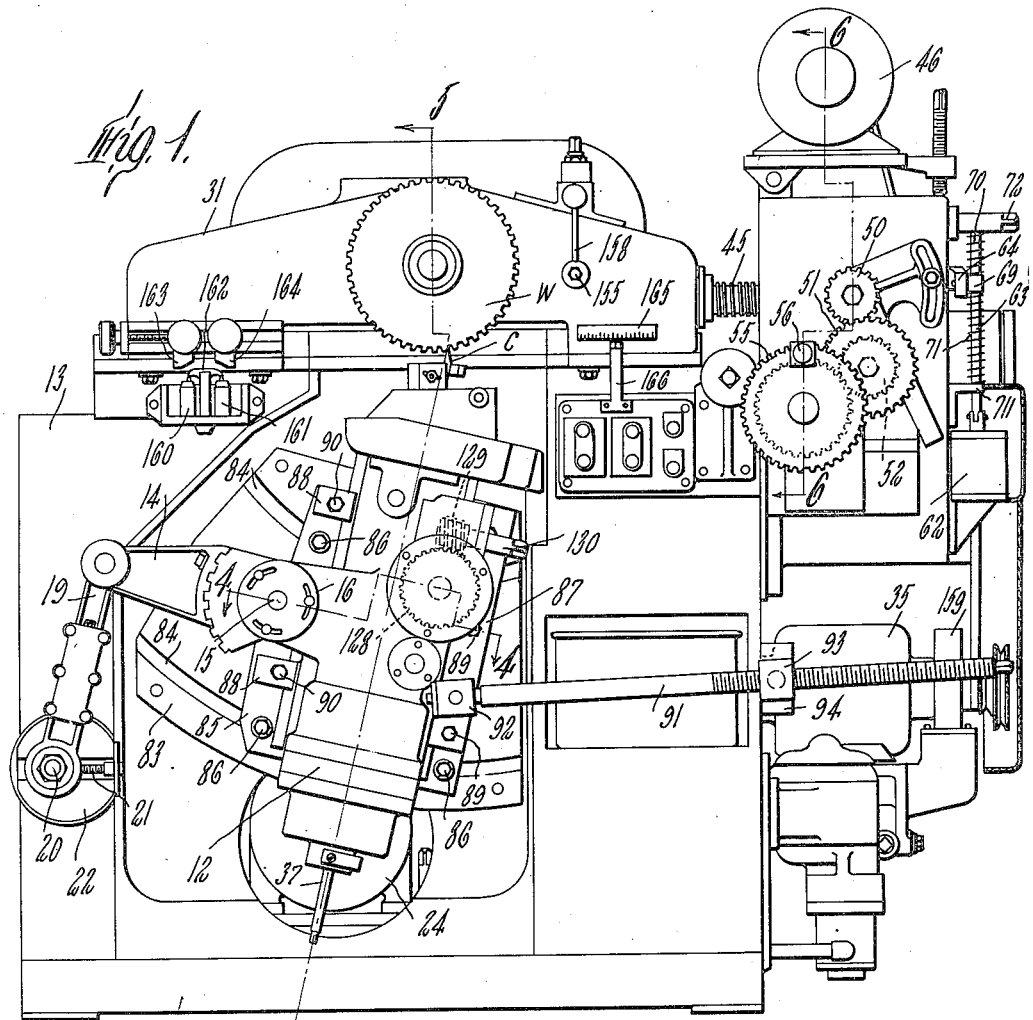
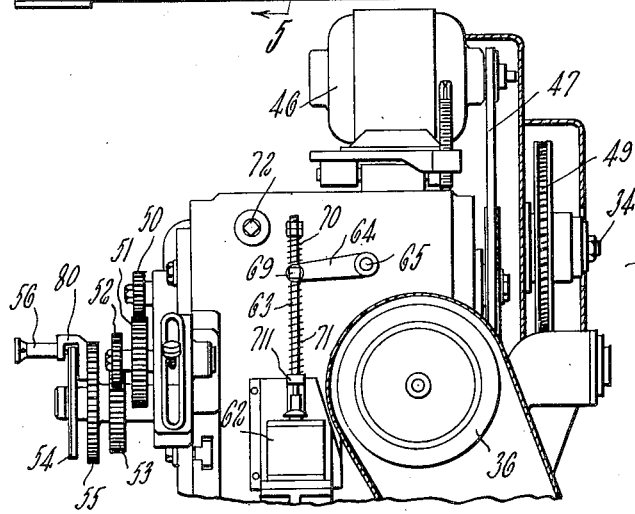
Inventor
Edward W. Miller April 17, 1951   E. W. MILLER   2,549,324
MACHINE FOR FINISH CUTTING THE TEETH OF GEARS, GEAR
SHAVING CUTTERS AND THE LIKE
Filed July 25, 1945   5 Sheets-Sheet 2

Inventor
Edward W. Miller

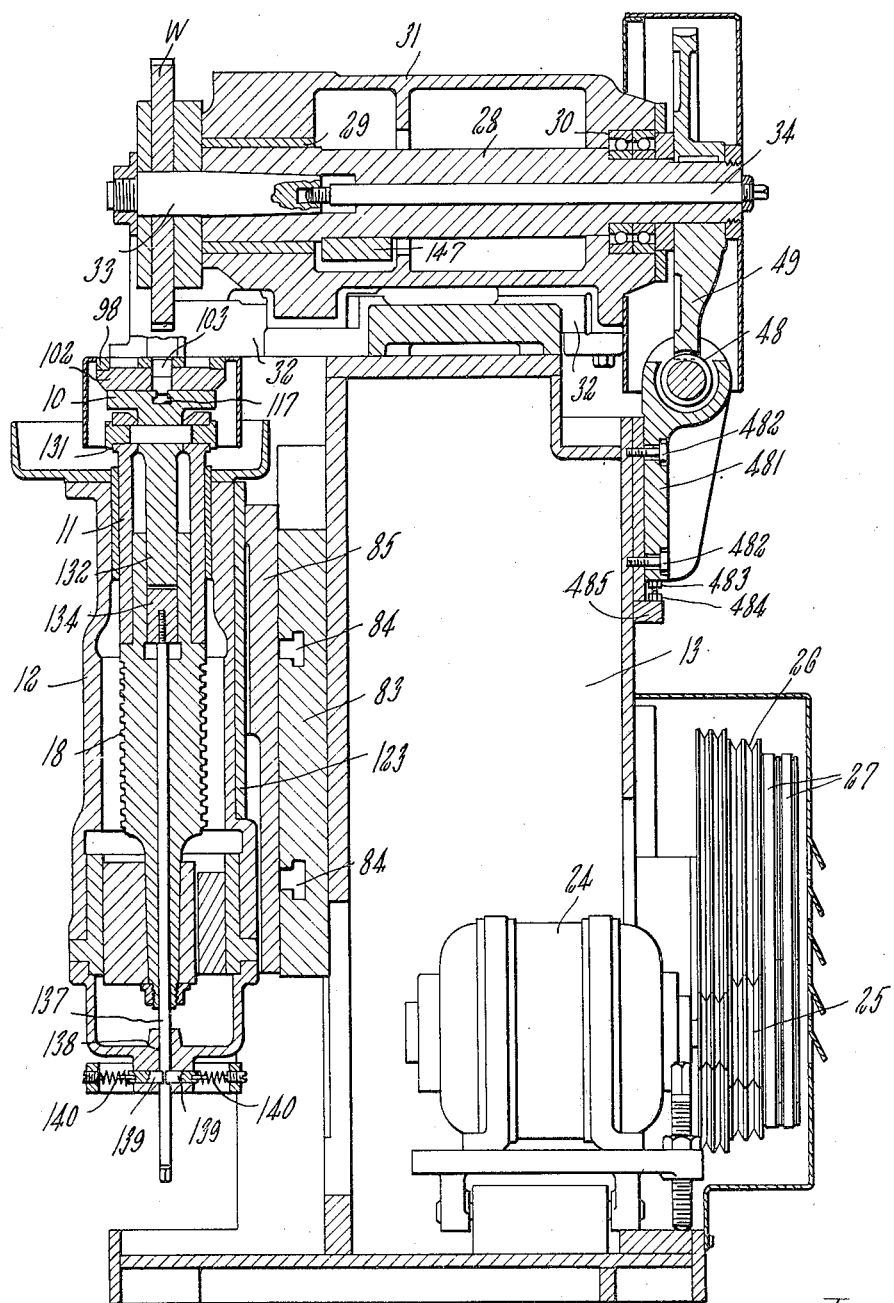

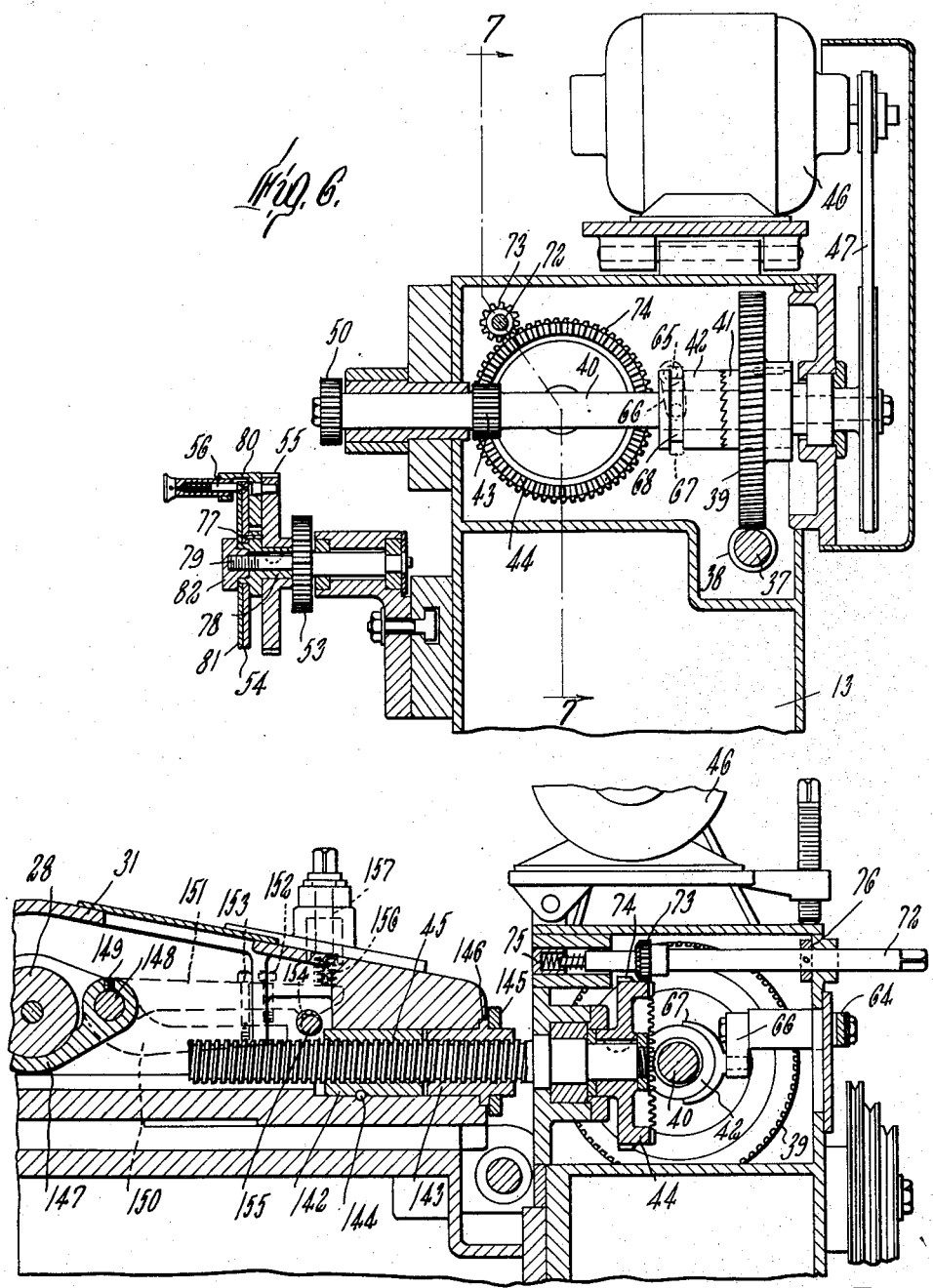

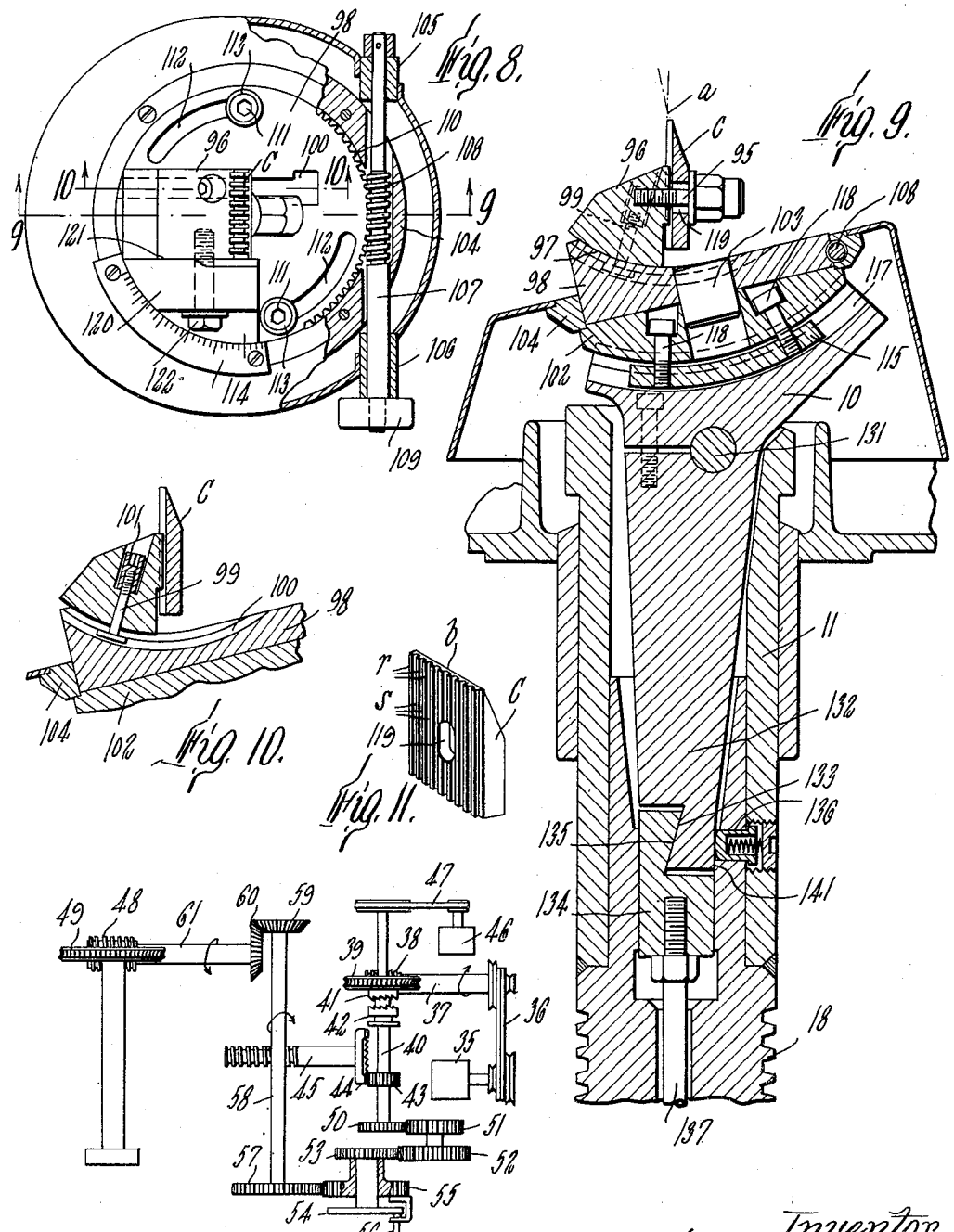

Patented Apr. 17, 1951

2,549,324

UNITED STATES PATENT OFFICE 2,549,324

MACHINE FOR FINISH CUTTING THE TEETH OF GEARS, GEAR SHAVING CUTTERS, AND THE LIKE

Edward W. Miller, Springfield, Vt., assignor to The Fellows Gear Shaper Company, Springfield, Vt., a corporation of Vermont Application July 25, 1945, Serial No. 606,995

18 Claims. (Cl. 90—8)

This invention is concerned with means for performing a finishing operation, by cutting action, on the teeth of gear shaving cutters, gears, and other tools and machine elements having curved surfaces like or analogous to the faces of gear teeth. In the finishing of gear shaving tools, the operation is to cut grooves or slots in the lateral faces of the teeth of such tools, and for such uses a cutting tool having a crenelated edge is employed. But where the finishing operation is to produce a smooth surface without grooves, a tool having a continuous straight, or somewhat curved edge may be used.

The objects and principles of the invention are broadly the same as those of the invention disclosed in my prior application filed May 15, 1941, Serial No. 393,554, (patented August 6, 1946, No. 2,405,159), entitled Method and Machine for Finishing the Teeth of Gear Shaving Cutters and the Like. It has additional objects of which one is to widen the range of helical teeth which may be effectively finished by the operation of the machine. Another is to enable the finishing tool and its carrier to be adjusted at various angles to the plane along which relative rolling movement between the work piece and cutting tool occurs in operation. Another is to provide a means for eliminating backlash and looseness of the work spindle in its bearing. Other objects will appear in the course of the description which follows of one machine in which the principles of the invention are embodied.

In the drawings,

Fig. 1 is a front elevation of the illustrative machine above referred to;

Fig. 2 is an elevation of the upper part of the machine as seen from the right hand side of Fig. 1;

Fig. 5 is a section from top to bottom of the machine taken on line 5—5 of Fig. 1;

Fig. 6 is a cross section of the upper part of the right hand end of the machine taken on line 6—6 of Fig. 1;

Fig. 7 is a longitudinal section of the right hand end of the machine taken on line 7—7 of Fig. 6;

Fig. 8 is a plan view of the cutter head of the machine partly broken away and shown in section;

Fig. 9 is a longtudinal section of the cutter head and part of the cutter carrying ram or spindle taken on line 9—9 of Fig. 8;

Fig. 10 is a detail sectional view of the cutter head taken on line 10—10 of Fig. 8;

Fig. 11 is a perspective view of one of the cutters used for grooving the teeth of gear shaving tools;

Fig. 12 is a schematic layout of the motors and transmission mechanism by which work pieces are caused to roll past the location of the cutting tool.

Like reference characters designate the same parts wherever they occur in all the figures.

The operation of finishing the tooth faces of gear shaving tools and similar work pieces is performed by reciprocating a cutter C rapidly in a prescribed path while the gear shaving tool or other work piece, designated W, is rolled across the path of reciprocation. When grooves or slots are to be cut, a cutter such as that shown in Fig. 11 is used, such cutter having a wide face formed with parallel ribs $r$ separated by spaces $s$, such ribs and spaces extending to the end boundary $b$ of the cutter and being ground off to form an edge of crenelated character. The cutter is made of suitable steel composition enabling it to cut metal work pieces. Similar cutters, but having a continuous edge, without crenelations, along the boundary $b$, may be employed to cut smooth continuous faces on gear teeth or like projecting parts of gear-like tools, or on projection which have curved surfaces similar to gear tooth faces.

Figure 3:
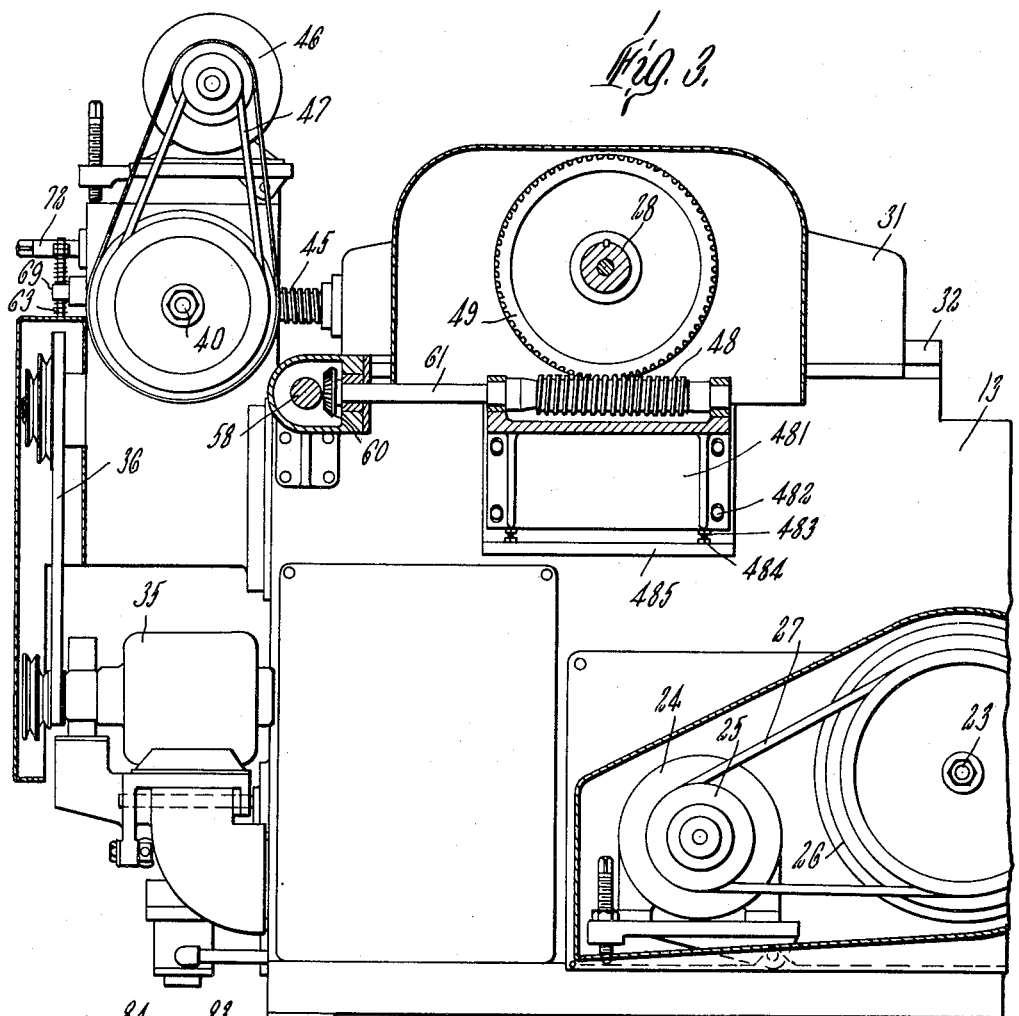
Fig. 3 is a rear elevation of the upper part of the machine with some parts broken away to show interior mechanism.
Figure 4:
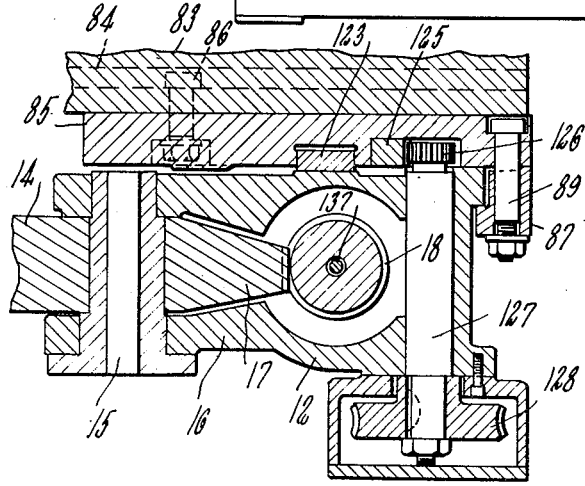
Fig. 4 is a cross section taken on line 4—4 of Fig. 1 and shown on a larger scale.

The cutter is secured to a cutter head 10 (see Fig. 9) carried by a ram or spindle 11, which reciprocates in a saddle or housing 12 mounted on the front of the machine base 13 (Figs. 1 and 5). Reciprocating movement is imparted to the ram by a lever 14 mounted to rotate on a pivot 15, which is supported by a bracket 16 of housing 12, and has an arm 17 (Fig. 4) formed as a gear segment meshing with teeth 18 cut in the side of the ram. The other arm of lever 14 is coupled by a connecting rod 19 of extensible and contractable telescopic construction, with a crank pin 20 adjustable by a screw 21 radially of a crank disk 22 on a shaft 23 (Fig. 3) which extends from front to rear of the machine and is driven by an electric motor 24 and pulleys 25 and 26 and belt 27.

The work piece W is given a combined motion of translation bodily and rotation around its own axis so that it, in effect, rolls on a plane transverse to the path in which the cutter C reciprocates, in a path which crosses the cutter path, and with a circumferential part in position to be incised by the cutter. It is mounted on a spindle 28 which rotates in bearings 29 and 30 in a carriage 31 supported on the machine base 13 in engagement with guides 32 which permit the carriage to reciprocate in a prescribed path. In this machine the cutter protrudes upward from the upper end of the ram, and the carriage is supported at a higher elevation than the cutter and the path of its movement is horizontal. The work spindle is preferably also horizontal and is arranged squarely transverse to the directions in which the carriage travels, and its axis is directly above the cutter C when the carriage is in or near the middle of its stroke. The work piece is connected with the spindle by being mounted on a tapered arbor 33 which is received in a tapered socket in the spindle and is secured by a tie rod 34, as plainly shown by Fig. 5. Suitable spacing disks are, or may be, mounted on the arbor beside the work piece as needed to locate it between the boundaries of the zone in which the cutter reciprocates. As the carriage reciprocates, the work piece is transported over the cutter, which is so adjusted that, when reciprocated, its cutting extremity crosses the horizontal plane tangent to the under side of the work piece and rises more or less above such plane conformably to the height of the work piece teeth.

A simplified comprehensive view of the mechanism for reciprocating the cutter carriage and rotating the work spindle is given by the schematic layout in Fig. 12. A motor 35, which for convenience is here called the feed motor, is coupled by a pulley and belt drive 36 with a shaft 37, which carries a worm 38 meshing with a worm gear 39 rotatable on a transverse shaft 40. Gear 39 carries a one way clutch element 41 which, in this embodiment, has ratchet teeth; and a complemental clutch element 42 is splined on shaft 40 so it can be put into and out of engagement with the element 41. Shaft 40 carries a spur gear 43 meshing with a crown gear 44 on a screw shaft 45, the threads of which mesh with a nut on the carriage 31. This driving train is designed to give a slow progressive movement to the carriage from left to right with respect to Fig. 1. A rapid return movement is imparted by a return motor 46 which is coupled directly to shaft 40 by a belt and pulley transmission 47, and is arranged to rotate that shaft in the opposite direction to that imparted by the feed motor. Each motor is deenergized when the other is active, and the clutch 41, 42 is disconnected when the return motor 46 is made active.

Rotation is imparted to the work spindle by a worm or screw 48 mounted with its axis horizontal at the rear of the machine beneath and in mesh with a worm gear 49 on the work spindle. Gear 49 rolls on the worm 48 as on a rack when the carriage is reciprocated, and the worm is long enough to maintain meshing engagement throughout the full traverse of the carriage. In addition, the worm is rotated proportionately to the differential between the operating pitch diameters of the work piece and worm gear 49 if the gear is larger or smaller in diameter than the work piece, by the shaft 40 through a train of change gears 50, 51, 52, 53, a dividing head or disk 54 connected with gear 53, a gear 55 coupled with disk 54 by a plunger 56, a gear 57 on a shaft 58 meshing with gear 55, and a gear pair 59 and 60, the former of which is fast on the shaft 58 and the other on the shaft 61 of the worm. By the conjoint action of the gear 49 rolling on worm 48 and rotation of the worm through the driving train last described, with proper selection of the change gears 50—53, the work piece is caused to rotate at a rate such that a prescribed pitch circle near its circumference rolls without slip on an imaginary horizontal plane tangent to such pitch circle at the under side thereof. That plane is refererd to elsewhere in this specification as the "rolling plane." It is transverse to the path in which the cutter reciprocates.

Mechanical embodiments of the elements thus schematically illustrated are shown in other figures of the drawing. Figs. 1, 2, 6 and 7 show the following described automatic means for coupling and uncoupling the clutch elements 41 and 42. The core of a solenoid 62 is connected by a rod 63 with an arm 64 (Figs. 1 and 2) secured to a rock shaft 65, to which is secured also an arm 66 (Figs. 6 and 7) carrying a yoke 67 contained in a groove 68 in the hub portion of the clutch element 42. Rod 63 passes through a block 69 pivoted to arm 64 and applies pressure thereto, when the solenoid is energized, through a spring 70 between the block and an abutment on the rod, to couple the clutch. A spring 71 surrounds the rod in stressed confinement between block 69 and a bracket 711 on the machine base structure, and disconnects the clutch when the solenoid is deenergized.

The screw shaft 45 can be turned by hand when the clutch is disconnected, to adjust the position of the carriage, and for that purpose a shaft 72 is provided (Fig. 7) carrying a pinion 73 which can be brought into mesh with spur gear teeth 74 on the crown gear 44 by moving the shaft endwise inwardly. A spring 75 normally pushes the shaft outwardly to the limit established by a collar 76, and holds pinion 73 out of mesh with teeth 74.

The indexing head or disk 54 (which serves for bringing successive teeth of the work piece into the cutting location beside transmitting rotation while cutting is being performed) is shown in Fig. 6 as being connected by a pin 77 to a sleeve 78 keyed to a shaft 79 to which the change gear 53 also is keyed. Gear 55, which is rotatable on the sleeve 78, carries a bracket 80 in which the plunger 56 is mounted, this plunger being spring actuated so that its inner end will enter any one of a series of holes in the dividing head with which it is brought into register. 81 is a masking disk clamped against the dividing head disk by a clamp nut 82 and having a single hole (or, if desired, more than one) adapted to be put in register with any one of the holes of the dividing head. The gear 55, with its plunger, and the dividing head constitute means for manually indexing the work after it has rolled past and clear of the cutter; and it typifies and represents any indexing means, whether manual or automatic, which could be used for the same purpose.

Due to the large gear reduction of the worm and wheel couple 38, 39 and the gear couple 43, 44, and the direct drive from the cutter actuating motor 24 to the main shaft 23, the cutter makes a multiplicity of strokes, in the order of hundreds, while a single tooth of the work rolls past it. Each stroke carries the cutting edge entirely across and through so much of the work piece as protrudes across the path of the cutter, and each successive stroke follows the preceding one before the work has advanced more than the distance of the feasible depth of a single cut. The cutter removes, in the course of each cutting stroke, all of the stock of the work piece lying across its path and, as a tooth of the work piece rolls past it, the cutting action progresses gradually along the side of the tooth face toward the root of the tooth until the entire face has been finished. Thus each tooth is finished in the course of one single traverse past the cutter. The pulleys of the belt drives from the motors 24 and 35 are made with steps of different diameters, on any one of which the associated belts can be placed, whereby the rate of cutter reciprocation can be varied.

Important novel features of the invention are provisions for varying the inclination of the path in which the cutter reciprocates with respect to the plane on which the pitch circle of the work piece rolls, in accordance with work pieces having tooth face curves of different pressure angles, and provisions by which the cutter can be adjusted about an axis perpendicular to the rolling plane, to act on helical teeth and surfaces of various helix angles, regardless of its pressure angle adjustment. The plane in which the edge of the cutter is reciprocated has a similar relation to the tooth of the work piece acted upon to that of a tooth face of a conjugate rack. Different work pieces have teeth which are conjugate to racks of different pressure angles. Hence, in order that such teeth be finished accurately, the plane of reciprocation should make an angle with the rolling plane equal to the prescribed pressure angle.

When finishing helical teeth and surfaces, the cutter is adjusted so that its edge is inclined, to the directions in which the work carriage reciprocates, at an angle equal to the helix angle of the work. If the axis around which such adjustment takes place is not perpendicular to the rolling plane or, in other words, if the plane in which the adjustments are made diverges from the rolling plane, then the action of the cutter is unequal in different parts of the length of the work, and the range of helix angles to which the cutter can be satisfactorily adapted is limited. One of the accomplishments of this invention is to remove the limitations on helix angle adjustment of the cutter which were inherent in prior machines.

The means for effecting pressure angle and helix angle adjustments in the present machine are as follows. A plate 83, which I call a swivel plate base, is secured to the front of the machine base 13 and has two undercut grooves 84 in its outer face. A plate 85, which I call a swivel plate, is held against the swivel plate base by bolts 86 having heads seated in the undercut grooves 84 and carrying nuts on their outer ends. The cutter ram housing or saddle 12 is secured against the swivel plate 85 by a gib 87 and clamps 88, which are secured by bolts 89 and 90, respectively. The grooves 84 are concentric with an axis lying in the plane of reciprocation and adjustment of the cutter, and parallel to the axis of the work spindle, wherefore shifting of the swivel plate enables this plane to be set at various angles to the rolling plane. The range of adjustment is such that the said plane of reciprocation may be put in vertical position or at an angle to the vertical as great as the greatest pressure angle of gears, and at all intermediate inclinations. The largest pressure angle commonly used in gears and in cutters for making and finishing gears is 30°.

Angular adjustment of the swivel plate is effected by a screw shaft 91, which has rotative and thrust bearings in a swivel block 92 pivoted on the gib 87, and passes through an internally threaded swivel block 93 which is pivoted on a bracket 94 secured to the machine base 13. The screw shaft may be rotated manually by a wrench applied to its square end.

The mounting of the cutter C on the cutter head 10 permits helix angle adjustment of the cutter around an axis perpendicular to the rolling plane, whatever may be the pressure angle adjustment effected by the means last described. The cutter is clamped by a bolt 95 (Fig. 9) to the face of a block 96 which has a cylindrical bottom face seated on the complemental concave cylindrical upper face 97 of a turn table 98. The block 96 is adjustable about the axis of the above mentioned cylindrical surface and is secured in various adjustments by a bolt 99 of which the head is seated in an undercut groove 100 in the turn table and the shank is engaged with a socket nut 101, as clearly shown in Fig. 10.

The turn table 98 is seated on a turn table base 102 and is fitted rotatably on a pivot 103 and within a ring 104, both of which are secured to the turn table base 102. Said pivot and ring provide circular bearing means for the turn table. Ring 104 supports bearings 105 and 106 in which is mounted rotatably a shaft 107 carrying a worm 108 and a knob 109 by which it may be manually rotated. The thread of worm 108, which may be cut directly in the shaft 107, meshes with worm gear teeth 110 cut in the circumference of turn table 98. The worm is self locking, which prevents accidental rotation of the turn table, and the turn table is additionally secured in adjusted position by bolts 111 which rise from the base 102 through arcuate slots 112 in the turn table and are provided with clamp nuts 113, as shown by Fig. 8. These slots, the pivot 103 and the bearing surface for the turn table in ring 104 all have the same axis. An angular scale 114 secured to the turn table base cooperates with an index or vernier on the turn table to measure the angular adjustments of the latter.

The turn table base 102 has a convex cylindrical under surface which is seated on a complemental concave surface on the upper end of the head 10. A clamp shoe 115 is fitted slidably in an undercut groove 117 in the head 10 and is engaged with the threaded shanks of screws 118 mounted in the base for taking up the shoe to clamp the base in various positions.

The cylindrical under surfaces of the cutter block 96 and turn table base 102, and the supporting surfaces on which they respectively rest, are coaxial, and their common axis is parallel to the rolling plane previously defined and perpendicular to the directions in which the work carriage 31 reciprocates. It is also parallel with the axis of the slots 84 in swivel plate base 83, and may coincide therewith when the saddle 12 is in one position of its linear adjustment, later described. It may be placed by such adjustment in the rolling plane or above or below that plane. The pivotal axis of the turn table 98 intersects the before named common axis at right angles. The cutter is located on its supporting block 96 with its cutting extremity at or near the intersection point of the two axes (shown at $a$ in Fig. 9), and preferably it extends equal distances to either side of the turn table axis. It is adjustable lengthwise, having a slot 119 through which the shank of bolt 95 passes, so that its extremity may be located exactly at the point $a$ or near thereto.

Ranges of adjustment for the parts thus described are great enough to permit the turn table axis to be alined with the path of ram 11 or inclined thereto at an equal and opposite angle to any angular adjustment of the saddle or housing 12; to incline the cutter in the same direction as the inclination of the saddle 12 and to the same degree, or substantially so, whereby the face of the cutter may be placed parallel to the direction of reciprocation, or at a slight angle thereto such as to provide clearance at the cutting edge; and to accommodate the edge of the cutter to helical teeth of all practical helix angles. To increase the rigidity with which the cutter block 96 is held in its adjusted positions, the turn table is provided with an upright lug 120 having a face 121 perpendicular to the axis of the surface 97, against which the block 96 is clamped by a bolt 122 threaded into the block and passing through an arcuate slot in lug 120 coaxial with the said axis.

Adjustment of the cutter to accommodate work pieces of different diameters is made by moving the cutter saddle lengthwise in the guideway provided by the gib 87 and clamps 88. Assisting guidance to the saddle in such movements is given by a key bar 123 secured to the rear side of the saddle and fitted slidingly in a guideway in the swivel plate 85 (Fig. 4), the key bar and second guideway being parallel to the other guideway. A bar 125 provided with rack teeth on one side, and secured to the swivel plate in parallel with the guideways, is engaged by a pinion 126 which is carried by a shaft 127 having a bearing in the saddle. A worm wheel 128 is fixed to shaft 127 and meshes with a worm 129 (shown dotted in Fig. 1) on a shaft 130 which protrudes from one side of the saddle and is adapted to be engaged by a wrench.

The cutter is backed off from the work prior to making its non cutting strokes and is returned into the cutting path at the commencement of its cutting strokes. For this purpose the cutter head is mounted in the tubular ram by a pivot pin 131, which is parallel to the width dimension of the cutter, and has an arm 132 extending into the interior of the ram. This arm is provided with a cam surface 133 at its lower end in a plane parallel to the axis of pivot 131. A wedge block 134 is fitted to move endwise in a guideway in the ram and is provided with a cam surface 135 complemental to the before mentioned cam surface 133, against which the latter is continuously pressed and held by a spring pressed plunger 136 (Fig. 9).

A rod 137 passes downwardly through the ram and through a passage 138 (Fig. 5) in the lower end of the housing. It is there gripped between friction members or pins 139 which are pressed against its opposite sides by springs 140 and are recessed so as to embrace a considerable part of the circumference of the rod. These pins act as brakes which withhold the wedge block 134 from movement at the beginning of each stroke of the ram and thus cause the block to be displaced relative to the cutter head arm 132. The relative upward displacement, made when the ram commences its down stroke (the noncutting stroke of the cutter), permits the spring plunger 136 to move arm 132 to the left (with respect to Figs. 1 and 9), thereby withdrawing the cutter from the work far enough to avoid rubbing; and the opposite relative movement of the wedge block at the commencement of the up stroke causes the lower end of the arm to be moved and forcibly held against an abutment surface 141 in the ram.

This backing off means is the same as that disclosed in my Patent 2,405,159 except that friction brake means are utilized for controlling the wedge block instead of the pneumatic means described in said patent.

Another important factor of the invention resides in means for taking up wear in the mechanism by which the work is reciprocated and rotated. These means are shown in Fig. 7. The connection between the screw 45 and the work carriage 31 is made by two nuts 142 and 143 in tandem, of which the former is secured by a pin 144 so that it cannot move either endwise or rotatively with respect to the carriage, while the other is capable of being rotated but is normally prevented from turning by a clamping collar 145 which is secured to the carriage by bolts and is arranged to surround the protruding end of the nut and to press a flange 146 of the nut against an abutting surface on the carriage. Upon loosening the clamp, the nut 143 can be turned enough to take up any looseness of the screw threads in the nut 142 and, after such an adjustment has been made, the clamp is tightened to prevent rotation of nut 143 during operation of the machine.

Looseness or play between the work spindle 28 and its front bearing 29 are taken up by a member 147 which underlies the spindle near the bearing 29 and is curved to engage a substantial part of the under side thereof. It acts both as a support, a means for pressing the spindle laterally upward against the contiguous side of the bearing, and a brake member and may be called for convenience a torque shoe. It is made fast to a rock shaft 148, by a set screw 149, or a key or other suitable means. An arm 150, shown dotted in Fig. 7, is also fast to the rock shaft and extends to the opposite side thereof from the torque shoe. An arm 151 is rotatably supported on the rock shaft and extends alongside arm 150 and both arms, at least in part, are in the same plane perpendicular to the axis of the rock shaft. These arms are interengaged by a push screw 152 and a pull screw 153, whereby they are coupled together and the angular relation between them can be adjusted and fixed. The extremity of arm 151 bears on a cam element 154 on a pressure relieving shaft 155, and is pressed against the cam element by a spring 156 reacting against an adjustable abutment screw 157. Thereby the torque shoe is pressed laterally against the spindle when the arm 151 engages the low part of the cam, with a force that can be adjusted by the push and pull screws and the abutment screw. Shaft 155 carries an operating lever 158 (Fig. 1) at the front of the carriage, whereby it may be turned to withdraw the torque shoe from the spindle.

For taking up backlash between the worm 48 and worm gear 49, the worm is mounted in bearings on an adjustable bracket 481. The bracket is secured to the base 13 by screws 482 and is supported by adjusting screws 483 and 484 mounted on a shelf 485 secured to the base. It will be apparent from Figs. 3 and 5 that, by means of the screws 483, the bracket may be adjusted vertically enough to obtain any desired closeness of mesh between the worm and gear, the holes in the bracket through which the screws 482 pass being sufficiently elongated to permit such adjustment.

The motors 35 and 46, a solenoid brake 159 for the motor 35, and the solenoid 62 are controlled by limit switches 160 and 161 mounted on the base and actuated through a lever 162 by dogs 163 and 164 mounted on the work carriage 31 in a manner permitting them to be adjusted in the directions of movement of the carriage. At the end of a prescribed length of movement of the carriage to the right, limit switch 160 is operated to open the circuits of motor 35 and solenoid 62, close the circuit of the solenoid brake 159 and close the circuit of the return motor 46. The electrical equipment includes means of known character for delaying starting of the return motor until the clutch 42 has been disconnected, and for causing the circuits which have been closed by either limit switch to remain closed until the other limit switch opens them. At the end of the return movement of the carriage, dog 164 operates limit switch 161 to restore the previous condition after lapse of time long enough for the work to be indexed. A scale 165 is mounted on the carriage adjacent to a stationary index 166 for convenience in adjusting the position of the carriage and the length of its strokes.

What I claim and desire to secure by Letters Patent is:

1. A machine for performing a finish cutting operation on the faces of gear teeth and similar objects, comprising cutter guiding means, a reciprocably mounted cutter in guided association therewith having a cutting edge transverse to the directions of its reciprocative movement, means for so reciprocating the cutter, means for supporting and rolling a work piece along a plane transverse to and intersecting the path of said cutting edge, and means for so adjusting the cutter guiding means and cutter as to bring the cutter path at various angles to the plane along which the work piece is rolled.

2. A machine for performing a finish cutting operation on the faces of gear teeth and similar objects, comprising means for supporting and rolling a work piece of gear character in pitch line relationship with a rolling plane in space, a cutter having a cutting edge of substantial length extending substantially parallel to such rolling plane, means for reciprocating the cutter in directions transverse both to said plane and to the axis of the rotary component of rolling movement of the work, in a location such that the edge of the cutter is carried back and forth across said plane, and guiding means for the cutter adjustably mounted to place the path of reciprocating movement of the cutter at various angles to the rolling plane corresponding to the pressure angles of various gears.

3. A machine for performing a finish cutting operation on the faces of gear teeth and similar objects, comprising a supporting structure, a work carriage guided on said structure to move back and forth in a prescribed path, a work holder rotatable on said carriage about an axis transverse to the directions of carriage reciprocation, means for reciprocating the carriage, a gear connected with the work holder, a worm independent of said carriage reciprocating means mounted on the supporting structure parallel with the directions of carriage reciprocation in mesh with said gear, adjustable means for rotating said worm at a selected rate such that a work piece of different pitch diameter than said gear is caused to roll in non slip pitch line relationship with a rolling plane parallel to said path, a cutter carrying ram, a guide with which said ram is engaged for reciprocating movement mounted on the structure with provision for angular adjustment about an axis substantially parallel to the work spindle axis, whereby the guide may be located at various angles to the rolling plane, means for reciprocating the same, and a cutter having an extended edge carried by the ram with its edge in position to perform a cutting action on a work piece tooth which is in course of approaching and receding from the rolling plane.

4. A machine for performing a finish cutting operation on the faces of gear teeth and similar objects, comprising means for supporting a work piece, means for imparting simultaneous movements of rotation and translation to said supporting means such that a work piece carried thereby is caused to roll in non slip pitch relationship to a rolling plane in space, a cutter ram guided to reciprocate toward and away from said rolling plane at the side therefrom away from the axis of the rotary movement of the work holder, guiding means for the ram adjustable to place the path of its reciprocating movement at different angles to the rolling plane, and means for supporting a cutter on the ram, said means having provisions for adjustment of the cutter about an axis, and provisions for placing such axis perpendicular to the rolling plane when the path of the ram is inclined to the rolling plane.

5. A machine for performing a finish cutting operation on the faces of gear teeth and similar objects, comprising a carriage, a work piece holder mounted rotatably on the carriage, means for imparting movement of translation to the carriage and rotation to the holder so as to give to a work piece carried by the holder a rolling movement equivalent to running in mesh with a stationary rack, a ram mounted to reciprocate toward and away from the nearest part of such a work piece in a path transverse to both the directions of translation and the axis of rotation of the work holder, the ram being angularly adjustable about an axis substantially parallel to that of the work holder to place the path of its reciprocation at different angles to the directions of said translative movements, circular bearing means carried by said ram with provisions for angular adjustment thereon equal and opposite to the angular adjustment of the ram, the axis of said bearing means being perpendicular to the work holder axis, and a cutter mounted on said bearing means for angular adjustment about the axis thereof and having an edge extending in directions substantially perpendicular to the axis of the circular bearing means.

6. A machine for performing a finish cutting operation on the faces of gear teeth and similar objects, comprising a supporting structure, a carriage mounted for guided movement on said supporting structure in a given path, a work spindle rotatably mounted on said carriage adapted to hold a work piece having a projection of gear tooth character, a worm rotatably mounted in a stationary location beside the carriage with its axis extending in parallel with the movements thereof, a gear secured to the work spindle in mesh with said worm, means independent of said worm for reciprocating the carriage and means for simultaneously rotating the worm at a rate relative to the speed of the carriage such that a projection of gear tooth character on a work piece secured to the spindle is caused to roll in the manner of a gear tooth rolling in mesh with a stationary rack, a tool carrying ram supported by said supporting structure, a cutter secured to said ram, and means for reciprocating the ram in directions such that the extremity of the cutter is caused to move in a plane corresponding to a tooth face of an imaginary rack in mesh with said work piece projection.

7. A machine as set forth in claim 6, in which the means for shifting the carriage comprise a screw in threaded connection with the carriage, and means for rotating said screw in opposite directions.

8. A machine as set forth in claim 6, in which the means for shifting the carriage comprise a screw in threaded connection with the carriage, driving means coupled with said screw for rotating it at a relatively slow speed in one direction and other driving means organized to rotate the screw in the opposite direction at a relatively high speed.

9. A machine as set forth in claim 6, in which the means for shifting the carriage comprise a screw in threaded connection with the carriage, an electric motor, reducing gearing interconnected between said motor and screw for rotating it slowly in one direction, including a disconnectible clutch, and a second motor in driving connection with said screw for rotating it at high speed in the opposite direction when said clutch is disconnected.

10. A machine as set forth in claim 6, in which the means for shifting the carriage comprise a screw in threaded connection with the carriage, an electric motor, reducing gearing interconnected between said motor and screw for rotating it slowly in one direction, including a disconnectible clutch, a second motor in driving connection with said screw for rotating it at high speed in the oppostie direction when said clutch is disconnected, and means controlled by the carriage in its back and forth movements for energizing said motors alternately and disconnecting the clutch when the second motor is energized.

11. A machine for performing a finish cutting operation on the sides of gear teeth and analogous curved forms, comprising a supporting structure, a carriage mounted on said supporting structure for guided movement in a prescribed path, means for reciprocating the carriage in such path, a work spindle rotatably mounted on said carriage with its axis transverse to the carriage path, adapted to hold a work piece having a projection of gear tooth character, a gear secured to said spindle, a worm mounted and withheld from endwise movement on the supporting structure in mesh with said gear and with its axis parallel to the carriage path, variable means for rotating said worm at any one of a variety of speeds, independent of the speed of said carriage rotating means and suitably related to the diameter of such a work piece to cause a tooth projection thereof to roll in the manner of a gear tooth rolling in mesh with a stationary rack, means for taking up looseness in the spindle bearing and between said gear and form, a ram supported reciprocably by the supporting structure, a cutter carried by said ram and protruding therefrom having an extended edge, and means for reciprocating the cutter and ram in a location such that the edge of the cutter is caused to reciprocate in a plane corresponding to a rack tooth face meshing with such tooth-like projection.

12. A machine as set forth in claim 11, in which the backlash and looseness take up means comprises a shoe in contact with one side of the spindle adjacent a spindle bearing, and force applying means acting on said shoe to press it against the spindle in a direction transverse to the axis of the spindle.

13. In a machine of the character described, a supporting structure, a ram, guiding means for the ram with which the ram is engaged for reciprocating movement in a given path, said guiding means being mounted on the supporting structure with provisions for angular adjustment about an axis substantially perpendicular to said path, a turn table base supported on the ram with provisions for angular movement thereon about an axis parallel to that of the before named axis, a turn table on the turn table base angularly adjustable thereon about an axis substantially perpendicular to the before named axes, and a cutter mounted on said turn table.

14. In a machine of the character described, a supporting structure, a ram, guiding means for the ram with which the ram is engaged for reciprocating movement in a given path, said guiding means being mounted on the supporting structure with provisions for angular adjustment about an axis substantially perpendicular to said path, a turn table base supported on the ram with provisions for angular movement thereon about an axis parallel to that of the before named axis, a turn table on the turn table base angularly adjustable thereon about an axis substantially perpendicular to the before named axes, and a cutter mounted on said turn table with provisions for angular adjustment about the axis around which the turn table base is adjustable on the ram.

15. In a machine of the character set forth, a supporting structure, means on said supporting structure for carrying and imparting rolling movement to a work piece having projections of gear tooth character, a saddle on said supporting structure, a ram mounted on said saddle for guided reciprocating movement in a fixed path, a cutter head pivoted to said ram having an arm extending lengthwise of the path of reciprocating movement of the ram having a cam surface inclined to said path, a cutter on said cutter head, a wedge block having a cam surface engaged with the before named cam surface, means arranged to apply force on said arm to hold the first named cam surface against the other cam surface, means for reciprocating the ram, and friction means held by the saddle arranged to resist movement of the wedge block with the ram whereby, when the ram commences its reciprocating movements in opposite directions, the wedge block is displaced relatively to the ram in a manner to cause backing off and return movements of the cutter.

16. In a machine of the character set forth, a supporting structure, means on said supporting structure for carrying and imparting rolling movement to a work piece having projections of gear tooth character, a saddle on said supporting structure, a ram mounted on said saddle for guided reciprocating movement in a fixed path, a cutter head pivoted to said ram having an arm extending lengthwise of the path of reciprocating movement of the ram having a cam surface inclined to said path, a cutter on said cutter head, a wedge block having a cam surface engaged with the before named cam surface, means arranged to apply force on said arm to hold the first named cam surface against the other cam surface, means for reciprocating the ram, a rod extending from the wedge block beyond the end of the ram opposite to the cutter, and spring pressed friction members mounted on the ram bearing against opposite sides of said rod for resisting movement of the wedge block with the ram and causing the block to shift relatively thereto.

17. In a machine of the character described, a carriage mounted to reciprocate on a supporting structure, a spindle rotatably mounted in bearings on said carriage, a gear secured to said spindle, a worm mounted on the supporting structure in mesh with said gear and with its axis parallel to the movement of the carriage, a torque shoe engaging one side of the spindle adjacent to said bearing, an arm coupled with said torque shoe, and means yieldingly exerting force on said arm to hold the shoe in pressure contact with the spindle and thereby force the spindle laterally against the contiguous side of the bearing.

18. In a machine of the character described, a carriage mounted to reciprocate on a supporting structure, a spindle rotatably mounted in bearings on said carriage, a gear secured to said spindle, a worm mounted on the supporting structure in mesh with said gear and with its axis parallel to the movement of the carriage, a torque shoe engaging one side of the spindle adjacent to said bearing, an arm coupled with said torque shoe, means yieldingly exerting force on said arm to hold the shoe in laterally applied pressure contact with the spindle, and manual means operative with said arm to relieve the pressure of the shoe from the spindle.

EDWARD W. MILLER.

REFERENCES CITED

The following references are of record in the file of this patent:

UNITED STATES PATENTS

| Number | Name | Date |
| --- | --- | --- |
| 1,549,438 | Blood | Aug. 11, 1925 |
| 1,645,106 | Maag | Oct. 11, 1927 |
| 2,029,094 | DeVlieg et al. | Jan. 28, 1936 |
| 2,072,540 | Wright | Mar. 2, 1937 |
| 2,096,134 | Raber et al. | Oct. 19, 1937 |
| 2,130,055 | Aeppli | Sept. 13, 1938 |
| 2,405,159 | Miller | Aug. 6, 1946 |

FOREIGN PATENTS

| Number | Country | Date |
| --- | --- | --- |
| 219,316 | Great Britain | Apr. 9, 1925 |